United States Patent
Mayoras et al.

[11] Patent Number: 6,011,318
[45] Date of Patent: Jan. 4, 2000

[54] WIRE HARNESS FOR VEHICLE SEAT

[75] Inventors: Frank Mayoras, Belleville; Jeffrey A. Branch, Eastpointe, both of Mich.

[73] Assignee: Lear Automotive Dearborn, Inc., Southfield, Mich.

[21] Appl. No.: 09/061,404

[22] Filed: Apr. 16, 1998

[51] Int. Cl.[7] .................................. B60L 1/00; B60N 2/44
[52] U.S. Cl. ........................ 307/10.1; 248/424; 297/311; 361/826
[58] Field of Search ...................... 307/9.1, 10.1; 361/826–828; 248/424, 429; 174/72 A; 297/311, 330, 341; 296/152; 180/326

[56] References Cited

U.S. PATENT DOCUMENTS

| | | |
|---|---|---|
| 3,946,768 | 3/1976 | Fiorentino . |
| 3,985,951 | 10/1976 | Harris . |
| 4,270,961 | 6/1981 | Faranetta et al. . |
| 4,444,705 | 4/1984 | Kumasaka et al. . |
| 4,653,155 | 3/1987 | Hara . |
| 4,923,537 | 5/1990 | Matsushima . |
| 4,941,258 | 7/1990 | Wright .................................... 307/10.1 |
| 5,030,116 | 7/1991 | Sakai et al. . |
| 5,082,253 | 1/1992 | Suzuki et al. . |
| 5,168,124 | 12/1992 | Takase et al. . |
| 5,230,146 | 7/1993 | Tsuji et al. . |
| 5,338,014 | 8/1994 | Kitamura . |
| 5,355,787 | 10/1994 | Burns et al. . |
| 5,483,853 | 1/1996 | Moradell et al. ........................ 297/330 |
| 5,490,664 | 2/1996 | Justus et al. . |
| 5,500,179 | 3/1996 | Onishi et al. . |
| 5,535,511 | 7/1996 | Karasik . |
| 5,598,627 | 2/1997 | Saka et al. . |
| 5,695,247 | 12/1997 | Premji ..................................... 297/341 |
| 5,877,936 | 3/1999 | Nishitani et al. ..................... 174/72 A |
| 5,893,768 | 4/1999 | Gawron et al. ........................ 296/152 |
| 5,924,515 | 7/1999 | Stauffer ................................. 180/326 |

FOREIGN PATENT DOCUMENTS 0235924  of 1987  European Pat. Off. .

*Primary Examiner*—Richard T. Elms
*Attorney, Agent, or Firm*—MacMillan, Sobanski & Todd, LLC

[57] ABSTRACT

A wire harness for electrically connecting a vehicle seat generally comprises a plurality of wires encased in a continuous sheath. The sheath preferably has a serpentine or other shape of reduced length in its undeformed state. In this manner, when the vehicle seat is moved between a first position and a second position excess slack in the wire harness is taken up by the shape memory characteristic of the wire harness, thereby preventing damage to the wires.

17 Claims, 2 Drawing Sheets

WIRE HARNESS FOR VEHICLE SEAT

BACKGROUND OF THE INVENTION

The present invention relates generally to wire harnesses and more particularly to a wire harness for a vehicle seat.

Many seats in current vehicles require numerous power, control and other wires to be routed from the vehicle to the seat. The seat may include one or more motors for moving the seat forward and rearward, repositioning the seat at various angles, etc. Vehicle seats may also include a heat source, built in speakers and side air bags which must be activated via the wiring. For all of these and other devices, a single wire harness is typically routed to the seat from the floor of the vehicle beneath the seat. The vehicle seat is mounted onto two parallel seat tracks and movable on the seat tracks from a forward position to a rearward position. Because the wire harness must be able to reach from the vehicle floor to the seat in either extreme position of the seat, the wire harness includes extra slack when the seat is in the middle position. As the seat moves between the extreme positions, the wire harness may be positioned completely or partially across the seat track. The wire harness may then be cut or damaged by the seat as it travels along the track. This is particularly undesirable if the wires activate the side airbag.

United Technologies Automotive has developed a new wire harness in which the wires are encased in molded foam sheath. This is described in more detail in co-pending applications U.S. Ser. No. 08/898,663, filed on Jul. 22, 1997 entitled "FOAMED-IN WIRE HARNESSES." Improvements are more fully disclosed in other co-pending application: "WIRE HARNESS WITH INTEGRAL CONNECTOR" U.S. Ser. No. 08/920,768; "APPARATUS FOR CENTERING WIRE HARNESS IN MOLD" U.S. Ser. No. 08/920,458; "WIRE HARNESS WITH SPLICE LOCATORS" U.S. Ser. No. 08/920,589; "METHOD AND APPARATUS FOR SECURING WIRE HARNESS TO SURFACE" U.S. Ser. No. 08/920,978; "MULTISHOT MOLDS FOR MANUFACTURING WIRE HARNESS" U.S. Ser. No. 08/920,857; "MOLDS FOR ASSEMBLING & FORMING WIRE HARNESS" U.S. Ser. No. 08/919,946; "FOAM WIRE HARNESS WITH SHAPE MEMORY" U.S. Ser. No. 08/920,570, all filed on Aug. 29, 1997; and "WIRE HARNESS FOAMED TO TRIM PANEL" U.S. Ser. No. 08/927,748 filed on Sep. 11, 1997.

SUMMARY OF THE INVENTION

The present invention provides a wire harness for a vehicle seat which controls the routing of the wires to prevent damage to the wires and wire harness.

A wire harness generally comprising a plurality of wires encased in a continuous sheath has an undeformed length which is preferably generally equal to the minimum length required at a middle position of the vehicle seat moveable between a forward position and a rearward position. The wire harness is deformable, during the movement of the vehicle seat, to a deformed length which is preferably at least equal to the length of wire harness required to reach the vehicle seat in the extreme forward and rearward positions. In this manner, excess slack in the wire harness is not damaged during movement of the seat. Preferably, the wire harness comprises a molded, polymer foam sheath which is disposed among and around the plurality of wires. The sheath is molded into an undeformed shape having a shape memory characteristic which is significantly reduced in length. Preferably, in its undeformed state the wire harness is serpentine, coiled, helical, etc.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
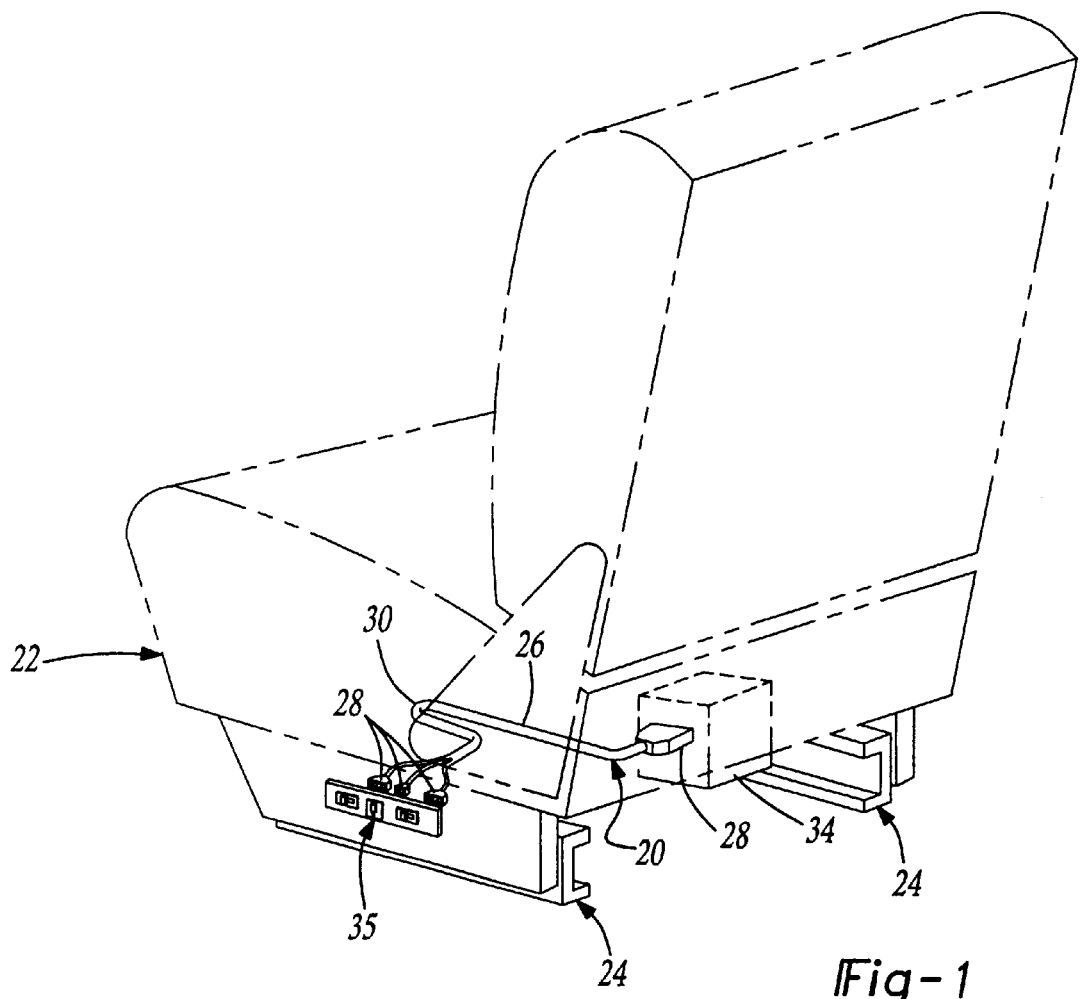
FIG. 1 is an exploded view of the wire harness of the present invention in a vehicle.

FIG. 1 shows a wire harness 20 according to the present invention for providing electrical connection to a vehicle seat 22 mounted on seat tracks 24. The wire harness 20 generally comprises a plurality of wires (not shown in FIG. 1) encased in a molded, polymer sheath 26. Preferably, the sheath 26 comprises a polymer foam, most preferably Elastoflex®, available from BASF. The wire harness 20 includes electrical connectors 28 mounted on either extreme end of the wire harness 20. The electrical connectors 28 provide electrical connection from the vehicle to the vehicle seat 22. The vehicle and vehicle seat 22 each include a complementary electrical connector 34, 35. The sheath 26 is preferably molded to include a serpentine portion 30 which significantly reduces the overall length of the wire harness 20 when the wire harness 20 is in its undeformed shape as shown in FIG. 1. The serpentine portion 30 may alternatively comprise a coiled portion, helical portion etc. Preferably, the sheath 26 material is selected so that the wire harness 20 is deformable to a generally straightened shape of increased length.

Figure 2C:
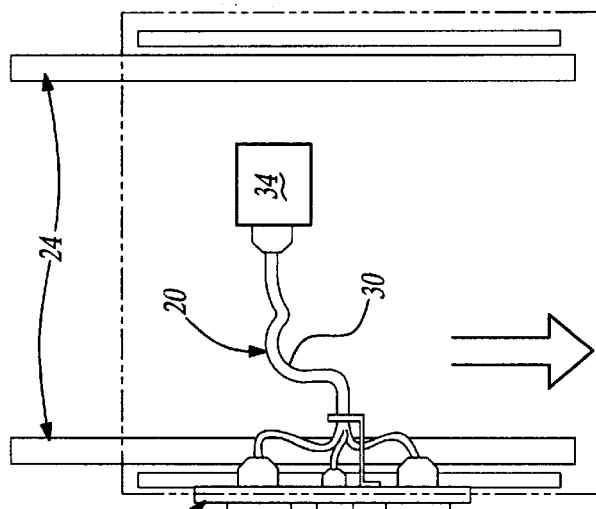
FIG. 2C illustrates the wire harness and vehicle seat of FIG. 2A while the vehicle seat is in a second extreme position.
Figure 2B:
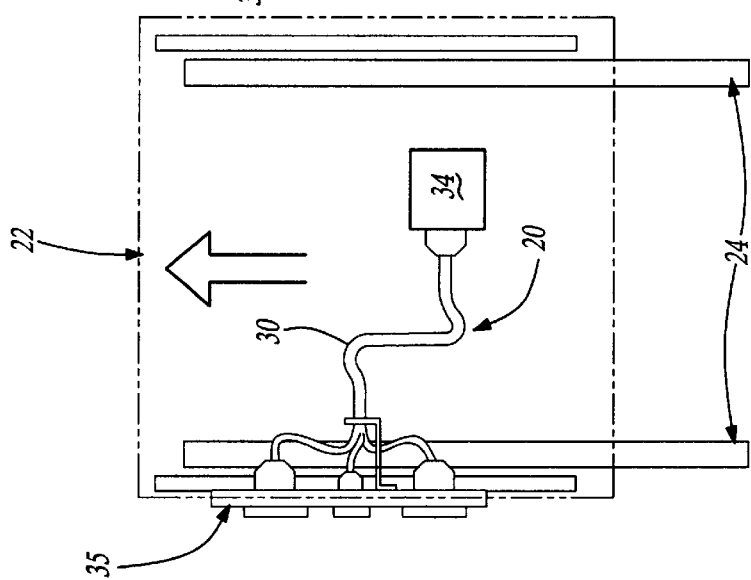
FIG. 2B illustrates the wire harness and vehicle seat of FIG. 2A while the vehicle seat is in a first extreme position.
Figure 2A:
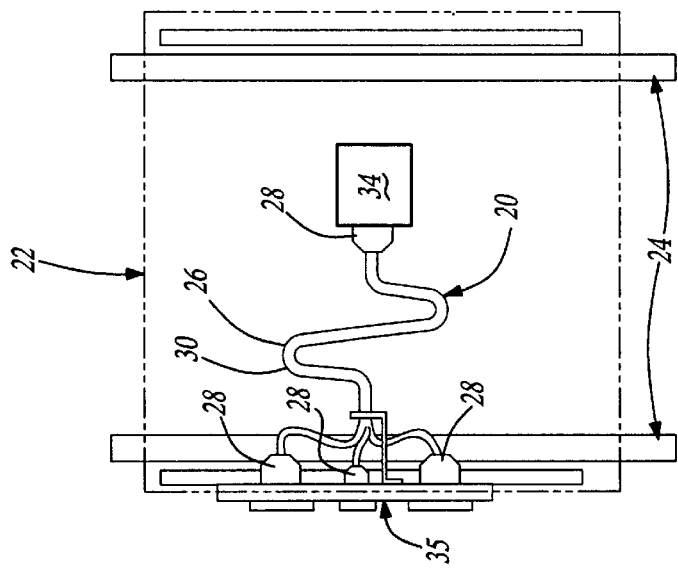
FIG. 2A is the wire harness and the seat of FIG. 1, with the vehicle seat in a middle position.

When the vehicle seat 22 is moved to a middle position as shown in FIG. 2A such that the wire harness 20 has its greatest amount of slack, the excess slack in the wire harness 20 is taken up by the serpentine portion 30. The shape memory of the serpentine portion 30 of the wire harness 20 returns to its undeformed shape when the vehicle seat 22 is in the middle position. In this manner, the wire harness 20 is kept away from the seat tracks 24 and damage to the wire harness 20 is avoided.

FIG. 2B illustrates the vehicle seat 22 moved to an extreme forward position, such that the wire harness 20 is deformed under tension to a generally straightened shape of increased length. The deformed length of the wire harness 20 is substantially equal, although preferably greater than, the length required to reach the vehicle seat 22 in the extreme forward positions.

FIG. 2C illustrates the vehicle seat 22 moved to an extreme rearward position, such that the wire harness 20 is also deformed under tension to a generally straightened shape of increased length. Again, the deformed length of the wire harness 20 is substantially equal, although preferably greater than, the length required to reach the vehicle seat 22 in the extreme rearward position.

Alternatively, the wire harness 20 may have the greatest slack in one of the extreme positions. In that case, the excess slack in the wire harness 20 is taken up by the serpentine portion 30 in one extreme position (forward or rearward). When the seat 22 is in the opposite extreme position the wire harness 20 is deformed under tension to a generally straightened shape of increased length. The deformed length of the wire harness 20 would be substantially equal, although preferably greater than, the length required to reach the vehicle seat 22 in the opposite extreme position.

Figure 3:
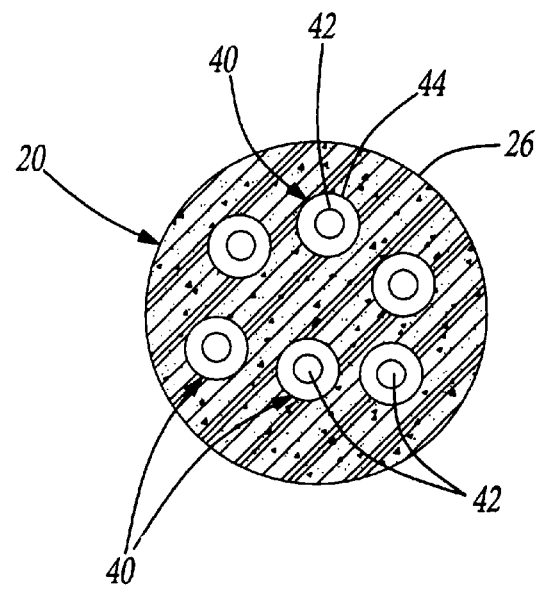
FIG. 3 is a sectional view through the wire harness.

FIG. 3 illustrates a cross section of the wire harness 20. The wire harness 20 preferably includes a plurality of wires 40 each comprising a conductor 42 encased by an insulator 44. The sheath 26 is preferably disposed around and among the wires 40, as shown in FIG. 4.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wire harness and vehicle seat comprising:

a vehicle seat moveable between a first position and a second position;

a wire harness comprising a plurality of wires encased in a continuous sheath, said sheath having an undeformed shape of a first length and being deformable to a second shape of a second length;

said wire harness connected to said vehicle seat, said wire harness having said undeformed shape when said vehicle is in said first position and said second length when said seat is in said second position.

2. The wire harness and vehicle seat of claim 1 wherein said vehicle seat is moveable on at least one seat track between said first position and said second position.

3. The wire harness and vehicle seat of claim 2 wherein said wire harness includes a first end connected to said vehicle seat and a second end which is generally fixed relative to said seat tracks.

4. The wire harness and vehicle seat of claim 1 wherein said sheath of said wire harness is a polymer.

5. The wire harness and vehicle seat of claim 1 wherein said sheath of said wire harness is a foam.

6. The wire harness and vehicle seat of claim 1 wherein said sheath is disposed around and among said plurality of wires.

7. The wire harness and vehicle seat of claim 1 wherein at least a portion of said wire harness in said undeformed shape is serpentine.

8. The wire harness and vehicle seat of claim 1 wherein at least a portion of said wire harness in said undeformed state is coiled.

9. The wire harness and vehicle seat of claim 1 wherein said wire harness includes a first electrical connector at a first end and a second electrical connector at a second end.

10. A wire harness for connecting to a vehicle seat comprising:

a plurality of wires;

a continuous sheath disposed around and among said plurality of wires, said sheath having an undeformed, first shape of a first length and being deformable to a second shape of a greater, second length;

a first electrical connector on a first end of said wire harness for connecting to a vehicle seat;

a second electrical connector on a second end of said wire harness for connecting to a vehicle.

11. The wire harness of claim 10 wherein said sheath of said wire harness is a polymer.

12. The wire harness of claim 10 wherein said sheath of said wire harness is a foam.

13. The wire harness of claim 10 wherein said sheath is disposed around and among said plurality of wires.

14. The wire harness of claim 10 wherein at least a portion of said wire harness in said undeformed shape is serpentine.

15. The wire harness of claim 10 wherein at least a portion of said wire harness in said undeformed state is coiled.

16. The wire harness of claim 10 wherein said wire harness includes a first electrical connector at a first end and a second electrical connector at a second end.

17. A method for routing wires to a vehicle seat including the steps of:

encasing a plurality of wires with a sheath having an undeformed first shape of a first length and deformable to a second shape of a second length greater than said first length;

connecting a first end of said plurality of wires to a vehicle seat;

connecting a second end of said wires to a vehicle;

moving said seat from a first position to a second position relative to said second end of said wires, thereby deforming said sheath from said first shape of said first length to a second shape of said second length.

* * * * *